Figure 1:
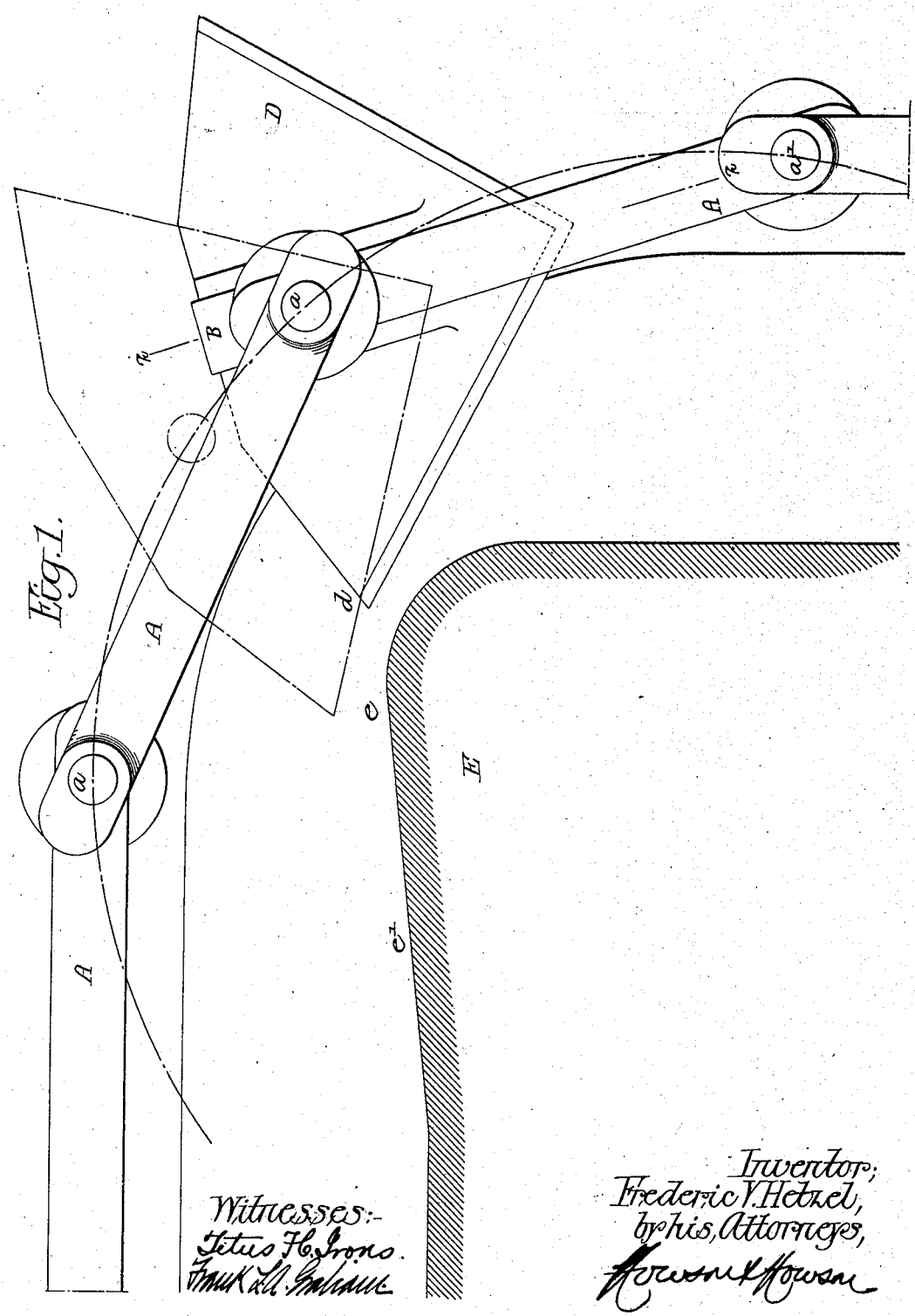

No. 751,396. PATENTED FEB. 2, 1904.
F. V. HETZEL.
BUCKET ELEVATOR AND CONVEYER.
APPLICATION FILED DEC. 9, 1903.
NO MODEL. 2 SHEETS—SHEET 1.

Witnesses:—
Titus H. Irons.
Frank L.L. Galbraith.

Inventor;
Frederic V. Hetzel,
by his Attorneys,
Howson & Howson

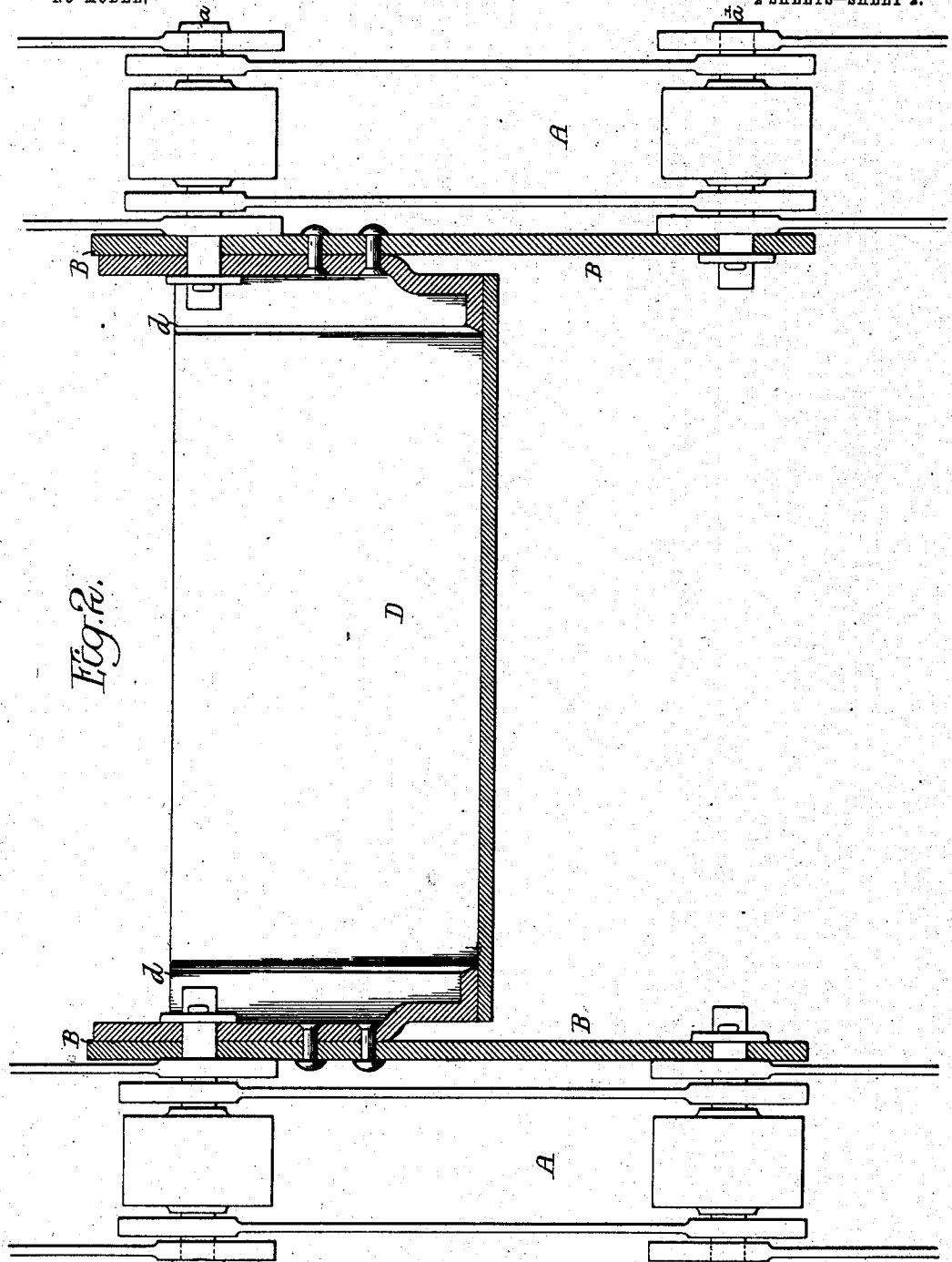

No. 751,396. Patented February 2, 1904.

UNITED STATES PATENT OFFICE.

FREDERIC V. HETZEL, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

BUCKET ELEVATOR AND CONVEYER.

SPECIFICATION forming part of Letters Patent No. 751,396, dated February 2, 1904.

Application filed December 9, 1903. Serial No. 184,447. (No model.)

*To all whom it may concern:*

Be it known that I, FREDERIC V. HETZEL, a citizen of the United States, residing in Philadelphia, Pennsylvania, have invented certain Improvements in Bucket Elevators and Conveyers, of which the following is a specification.

My invention relates to that class of conveyers in which a bucket is used to elevate the material in the vertical run and to push the material along the trough on the horizontal run.

The object of my invention is to prevent any discharge of material from a bucket before the edge of the bucket is over the carrying portion of the trough. This object I accomplish by so mounting the buckets on the carrying-chains that on the first movement of the chain-links on the sprocket-wheels the edge of the bucket will move to a position over the trough, so that when the bucket is tipped sufficiently to discharge some of the material it will discharge onto the trough and not into the vertical runway.

In the accompanying drawings, Figure 1 is a side view of sufficient of a combined elevator and conveyer to illustrate my invention, the trough being in section; and Fig. 2 is a section on the line 2 2, Fig. 1, the chains being in elevation.

A A are the chains of an ordinary combined elevator and conveyer, and secured to these chains are plates B B, to which is secured the bucket D. This bucket is preferably of the V-shaped type, as shown in Fig. 1, although I do not limit myself to this shape of bucket.

E is a horizontal trough on which the material is discharged by the buckets as they turn from the vertical run, the buckets acting as flights while conveying the material over this trough.

Heretofore each bucket was so attached to the chain-links that the edge of the bucket was between the pitch points or pivots $a$ $a'$, (usually midway,) and consequently traveled in a comparatively small arc of a circle, and the trough had to be cut down, so that the buckets would clear it in turning. The buckets in this instance would tip before their edges were well over the trough, and consequently some material would be accidentally discharged into the vertical runway. Furthermore, the trough E had to be cut away or shaped to allow the buckets to pass from the vertical run to the horizontal run, and the material in some instances would slide back from the trough into the vertical runway.

I overcome the above objection by mounting the bucket so that its lip $d$, over which the material is discharged, is about on a line with or above the pivot $a$ of the links to which the bucket is attached, so that when the bucket reaches the top of the vertical run it will have an extended movement before tipping to such an angle as to cause some of its contents to be discharged over the lip $d$. When, however, the bucket does tip to such a degree, then the lip is over the trough and the material will discharge onto the trough and not into the vertical runway.

By my improvement I am enabled to make the end $e$ of the trough E slightly raised and form an incline at $e'$, where the buckets discharge the material onto the trough, so that the material cannot fall back into the vertical runway.

I claim as my invention—

1. The combination, in a combined bucket elevator and conveyer, of a trough, a chain having links, a bucket secured to one of the links of the chain at such point that when the bucket reaches the head of the vertical runway, it will have an extended lateral movement over the trough before tipping to such a degree as to discharge some of the material carried thereby, substantially as described.

2. The combination, in a combined bucket elevator and conveyer of a chain buckets attached thereto, a horizontal trough over which the buckets push the material, the end of the trough at the vertical runway being raised, the trough being inclined at the point where the buckets discharge their contents, substantially as described.

3. The combination, in a combined bucket elevator and conveyer of a horizontal trough, two chains made up of links pivoted together, a V-shaped bucket mounted between the chains and secured thereto, the lip of the bucket being about on a line with or above the upper pivots of the chains so that when turning, it will be above the trough before the bucket tilts to such a degree as to discharge its load, substantially as described.

In testimony whereof I have signed my name to this specification in the presence of two subscribing witnesses.

FREDERIC V. HETZEL.

Witnesses:
WILL. A. BARR,
JOS. H. KLEIN.